(12) United States Patent
Takada et al.

(10) Patent No.: US 10,286,894 B2
(45) Date of Patent: May 14, 2019

(54) HYBRID WORK MACHINE

(71) Applicant: KCM Corporation, Hyogo (JP)

(72) Inventors: Tomonori Takada, Tokyo (JP);
Takashi Ikimi, Hitachi (JP); Kazuya Sekine, Mito (JP); Masaki Higurashi, Tsukuba (JP)

(73) Assignee: KCM Corporation, Hyogo (JP)

( * ) Notice: Subject to any disclaimer, the term of this patent is extended or adjusted under 35 U.S.C. 154(b) by 215 days.

(21) Appl. No.: 15/122,240

(22) PCT Filed: Apr. 9, 2015

(86) PCT No.: PCT/JP2015/061116
§ 371 (c)(1),
(2) Date: Aug. 29, 2016

(87) PCT Pub. No.: WO2015/156357
PCT Pub. Date: Oct. 15, 2015

(65) Prior Publication Data
US 2016/0368472 A1     Dec. 22, 2016

(30) Foreign Application Priority Data
Apr. 11, 2014  (JP) .................................. 2014-082371

(51) Int. Cl.
*B60W 20/10* (2016.01)
*H01M 16/00* (2006.01)
(Continued)

(52) U.S. Cl.
CPC ............. *B60W 20/10* (2013.01); *B60K 6/46* (2013.01); *B60K 6/50* (2013.01); *B60K 25/02* (2013.01);
(Continued)

(58) Field of Classification Search
CPC ....... H02M 3/155; B60L 1/003; B60L 11/005; H02J 1/102; H02J 3/38; H02J 7/32;
(Continued)

(56) References Cited

U.S. PATENT DOCUMENTS

2005/0263329 A1* 12/2005 Kuras ...................... B60K 6/46
180/65.1
2012/0187756 A1* 7/2012 Yanagisawa .......... B60L 11/005
307/9.1
(Continued)

FOREIGN PATENT DOCUMENTS

CN          102619252 A      8/2012
JP          10-1979 A        1/1998
(Continued)

OTHER PUBLICATIONS

International Search Report (PCT/ISA/210) issued in PCT Application No. PCT/JP2015/061116 dated Jun. 30, 2015, with English translation (four (4) pages).
(Continued)

*Primary Examiner* — Yuri Kan
(74) *Attorney, Agent, or Firm* — Crowell & Moring LLP (57) ABSTRACT

A hybrid work machine includes: an engine configured to drive a hydraulic pump as a hydraulic source of a hydraulic actuator; an engine-assist motor generator attached to the engine; an electric motor for use in a part of a driving system of the work machine; an electricity storage device configured to store generated power of the motor generator; a power converter disposed between the electric motor and DC buses; and a buck-boost converter disposed between the DC buses and the electricity storage device, and configured to perform power transfer between the DC buses and the electricity storage device by raising and lowering a voltage of the DC buses, the hybrid work machine, further comprises: a controller configured to temporarily raise the volt-
(Continued)

age of the DC buses when a torque required for the electric motor exceeds a torque outputtable at the voltage of the DC buses connected to the power converter.

5 Claims, 10 Drawing Sheets

(51) Int. Cl.
| | |
|---|---|
| H02J 3/38 | (2006.01) |
| H02J 7/32 | (2006.01) |
| B60K 6/46 | (2007.10) |
| E02F 9/20 | (2006.01) |
| H02M 3/155 | (2006.01) |
| H02M 7/5387 | (2007.01) |
| B60K 6/50 | (2007.10) |
| B60K 25/02 | (2006.01) |
| E02F 3/34 | (2006.01) |
| H02P 7/18 | (2006.01) |
| H02M 1/00 | (2006.01) |

(52) U.S. Cl.
CPC .............. *E02F 3/34* (2013.01); *E02F 9/2075* (2013.01); *E02F 9/2091* (2013.01); *E02F 9/2095* (2013.01); *H02M 3/155* (2013.01); *H02M 7/5387* (2013.01); *H02P 7/18* (2013.01); *B60K 2025/026* (2013.01); *B60W 2300/17* (2013.01); *B60W 2510/081* (2013.01); *B60W 2510/083* (2013.01); *B60W 2710/083* (2013.01); *B60W 2710/086* (2013.01); *B60Y 2200/92* (2013.01); *B60Y 2300/18* (2013.01); *B60Y 2300/60* (2013.01); *B60Y 2400/87* (2013.01); *E02F 3/3417* (2013.01); *E02F 9/2079* (2013.01); *H02M 2001/007* (2013.01); *Y02T 10/6217* (2013.01); *Y10S 903/915* (2013.01)

(58) Field of Classification Search
CPC ............ B60K 6/46; E02F 9/20; B60W 20/10; H01M 16/00
See application file for complete search history.

(56) References Cited

U.S. PATENT DOCUMENTS

| | | | | |
|---|---|---|---|---|
| 2013/0065089 | A1* | 3/2013 | Kazuno | B60L 1/003 429/9 |
| 2016/0308362 | A1* | 10/2016 | Jung | H02J 1/102 |

FOREIGN PATENT DOCUMENTS

| | | | | |
|---|---|---|---|---|
| JP | 2003-110172 | A | 4/2003 | |
| JP | 2005-9381 | A | 1/2005 | |
| JP | 2005-155862 | A | 6/2005 | |
| JP | 2009-191463 | A | 8/2009 | |
| JP | 2009191463 | * | 8/2009 | ............... E02F 9/20 |
| JP | 2010-116760 | A | 5/2010 | |
| JP | 4949288 | B2 | 3/2012 | |
| JP | 2013-52866 | A | 3/2013 | |

OTHER PUBLICATIONS

Chinese-language Office Action issued in counterpart Chinese Application No. 201580011777.0 dated Jul. 3, 2017 (Five (5) pages).

* cited by examiner

FIG.10 ized driving mechanism is employed instead of a
HYBRID WORK MACHINE

TECHNICAL FIELD

The present invention relates to a hybrid work machine, such as a wheel loader, having a driving mechanism, a part of which is motorized.

BACKGROUND ART

Hybrid work machines have conventionally been known in which an engine-assist motor generator is attached to an engine which drives a hydraulic pump, and a partially motorhydraulic driving mechanism, such as a hydraulic cylinder and a hydraulic motor. This type of hybrid work machine includes an electricity storage device to store generated power from the motor generator and regenerative power of an electric motor, and a power converter to convert these electric powers, a buck-boost converter and the like.

The motor generator is connected via the power converter to a DC bus, and the DC bus is connected via the buck-boost converter to the electricity storage device. The electric motor is connected via another power converter to the DC bus. When the motor generator and the electric motor perform power-run operation, the buck-boost converter boosts a voltage supplied by the electricity storage device to a DC input voltage to the power converter and the power converter converts DC to AC so as to drive the motor generator. When the electric motor performs regenerative operation, the regenerative power is converted to a DC voltage by the power converter, and is stepped down by the buck-boost converter and then stored in the electricity storage device.

In a hybrid work machine described in PTL 1, each of an engine-assist motor generator and an electric motor for turning is provided with a buck-boost converter and a DC bus from a common electricity storage device in order that different voltages are obtainable on these DC buses. That is, in the engine-assist motor generator to be used only at a constant rotation speed, the DC bus (an input DC voltage to a power converter) is set to an approximately constant voltage value. In the electric motor for driving turning whose output frequently changes according to a lever operation amount, a voltage value at the DC bus is allowed to change according to a rotation speed of the electric motor for turning, thereby achieving efficient driving.

CITATION LIST

Patent Literature

PTL 1: Japanese Patent No. 4949288

SUMMARY OF INVENTION

Technical Problem

However, the DC bus voltage needed by the electric motor strongly depends not only on the rotation speed of the electric motor but also on magnitude of load. Therefore, with the method of variably controlling the DC bus voltage according to the rotation speed of the electric motor as described in PTL1, when applied to a system subjected to a large load for a short time irrespective of the rotation speed of the electric motor, such as a travel motor for a wheel loader, the electric motor may fail to develop output necessary for traveling.

Therefore, the DC bus voltage has usually been controlled at a fixed value all the time with respect to an electric motor driving system subjected to the large load for the short time. By making a control command value of the DC bus voltage at that time coincide with a maximum DC voltage value necessary for operation of the electric motor all the time, the electric motor is capable of developing a maximum torque according to the rotation speed of the electric motor.

When the DC bus voltage is held high all the time, however, heat generation due to switching loss adversely affects the power converter. In particular, taking into consideration that the heat generation in the power converter due to the switching loss increases along with the DC bus voltage, the control, under which the DC bus voltage is held high all the time for the large load not required except for the short time, causes unnecessary heat generation. Hence, when controlling the DC bus voltage at the fixed value all the time, the DC bus voltage is usually controlled at a value lower than a maximum value of a voltage necessary for the electric motor to develop the maximum torque over all the rotation speeds. There has accordingly been the problem that the output of the electric motor is limited because the DC bus voltage is low.

The present invention has been made in view of the above problems, and aims at providing a hybrid work machine that makes it possible to improve a maximum output of an electric motor for a short time while reducing heat generation in a power converter connected to the electric motor, thereby improving working efficiency.

Solution to Problem

A hybrid work machine according to a first aspect of the present invention comprises: an engine configured to drive a hydraulic pump as a hydraulic source of a hydraulic actuator; an engine-assist motor generator attached to the engine; an electric motor for use in a part of a driving system of the work machine; an electricity storage device configured to store generated power of the motor generator; a power converter disposed between the electric motor and DC buses; and a buck-boost converter disposed between the DC buses and the electricity storage device, and configured to perform power transfer between the DC buses and the electricity storage device by raising and lowering a voltage of the DC buses, the hybrid work machine, further comprises: a controller configured to temporarily raise the voltage of the DC buses when a torque required for the electric motor exceeds a torque outputtable at the voltage of the DC buses connected to the power converter.

Advantageous Effects of Invention

With the present invention, it is possible to cause the work machine to operate without decreasing the rotation speed of the electric motor by temporarily increasing output torque of the electric motor. It is therefore possible to improve working efficiency.

DESCRIPTION OF EMBODIMENTS

Figure 1:
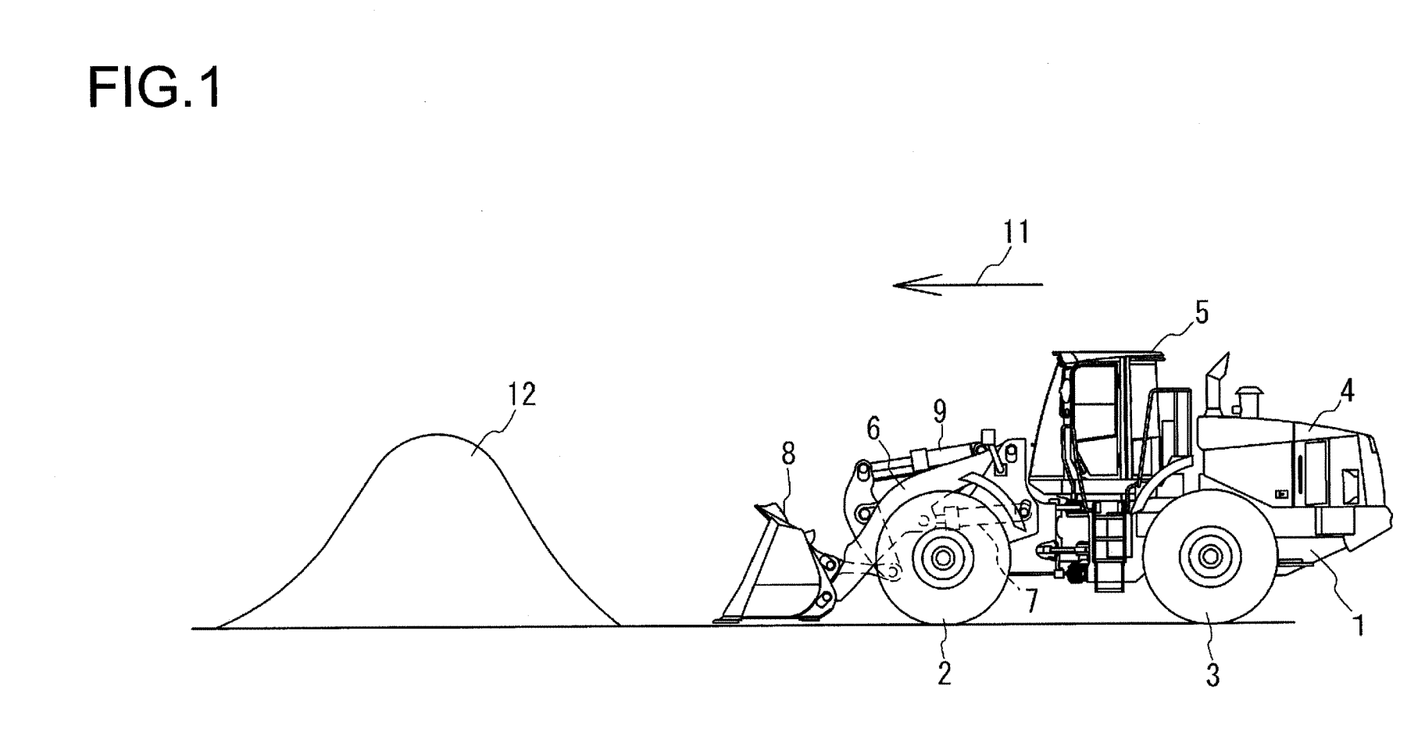
FIG. 1 is a side view showing a wheel loader, as an example of hybrid work machines to which the present invention is applied, in a situation before inserting a bucket into a mound of earth and sand.
Figure 2:
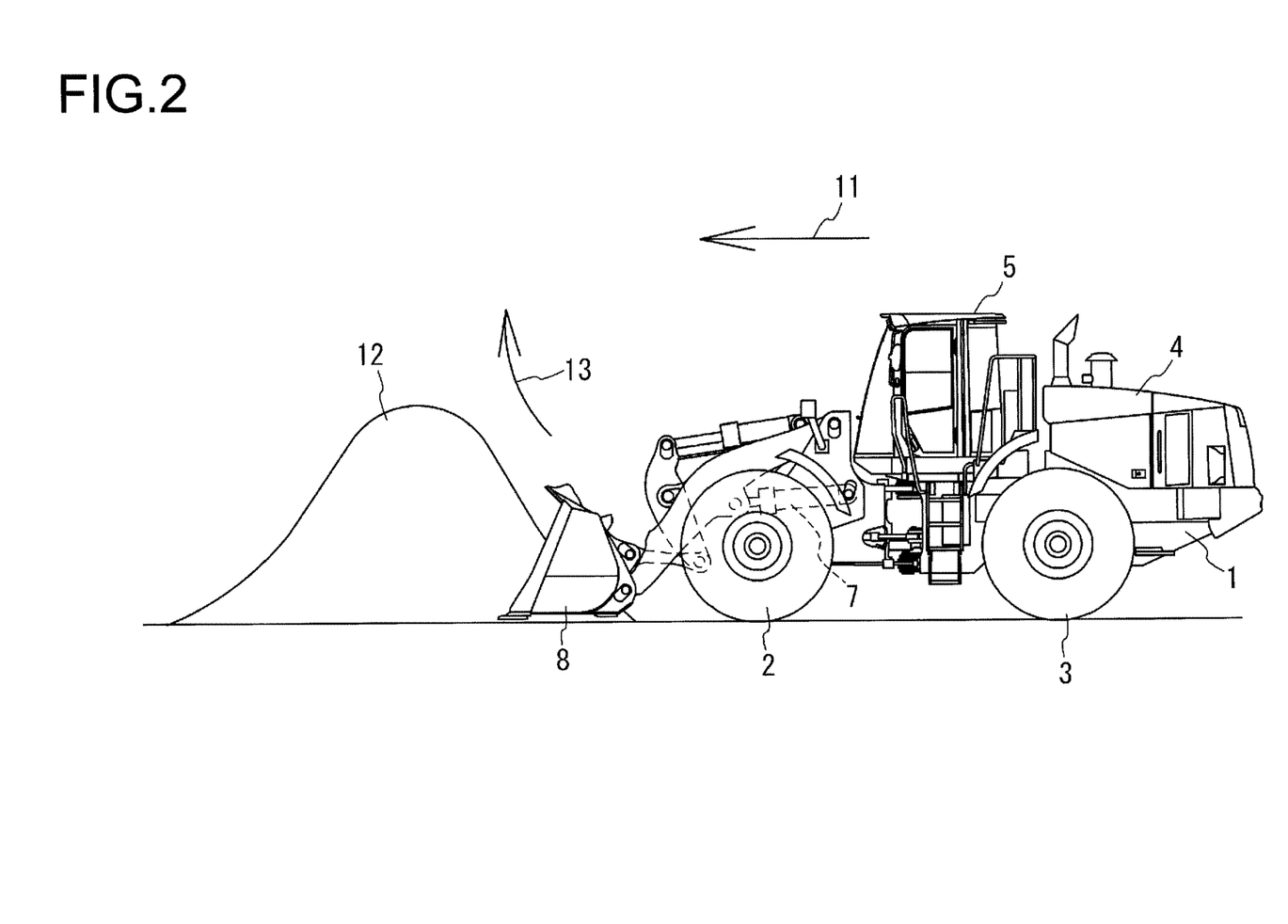
FIG. 2 is a side view showing the wheel loader in FIG. 1 in a situation where the wheel loader inserts the bucket into the mound of earth and sand.
Figure 3:
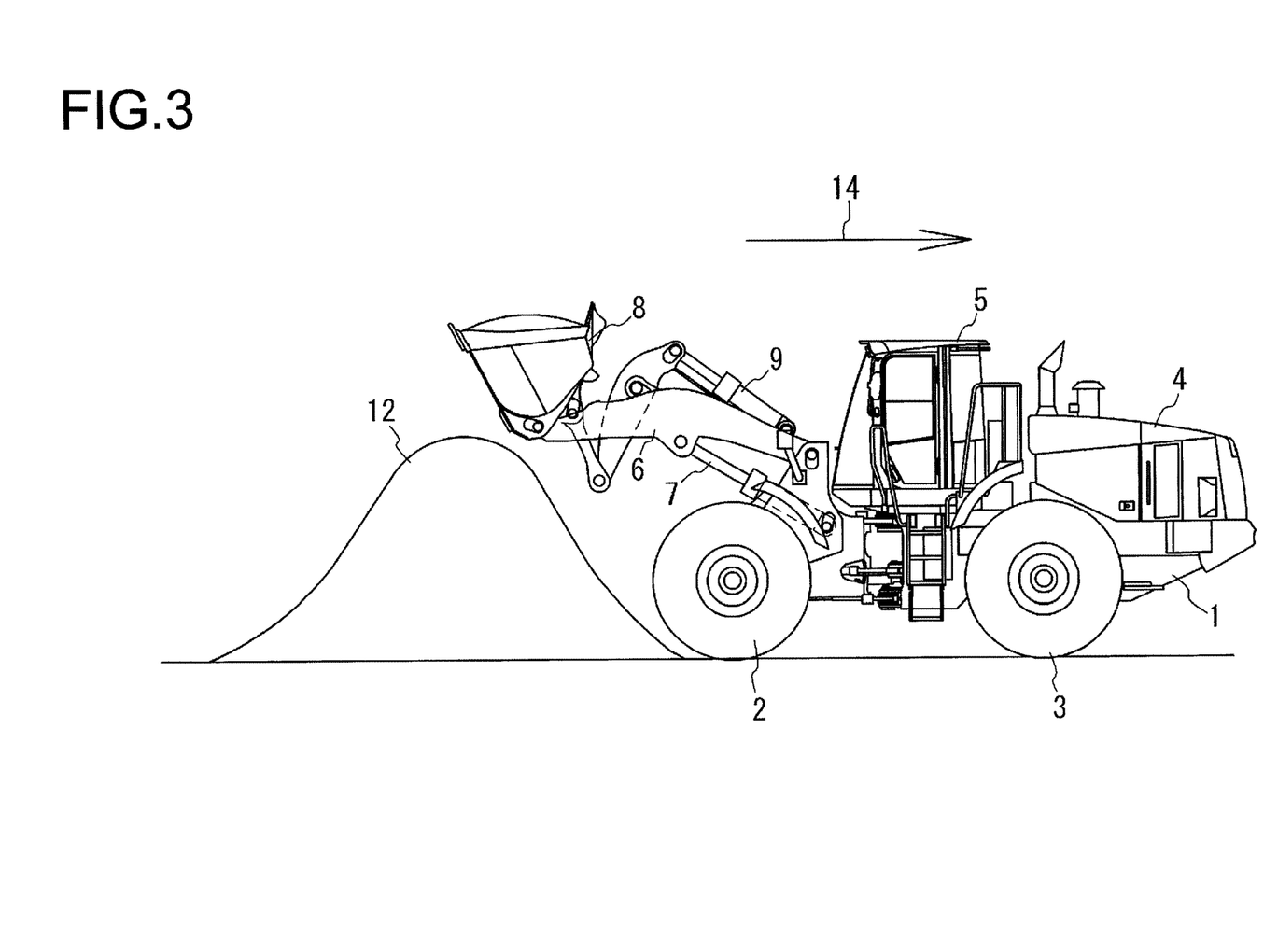
FIG. 3 is a side view showing the wheel loader in FIG. 1 in a situation where the wheel loader lifts the bucket after inserting the bucket into the mound of earth and sand.

FIG. 1 is a side view showing a wheel loader, as an example of hybrid work machines to which the present invention is applied, in a situation before inserting a bucket into a mound of earth and sand. FIGS. 2 and 3 respectively show a situation where the bucket is inserted into the mound of earth and sand, and a situation where the bucket is lifted. In FIGS. 1 to 3, reference numeral 1 denotes a vehicle body of the wheel loader, and reference numerals 2 and 3 respectively denote a front wheel and a rear wheel of the wheel loader which are respectively attached to a front part and a rear part of the vehicle body 1. A power source device 4 and an operator's cab 5, which are described later, are mounted on the vehicle body 1.

A boom (also called lift arm) 6 is attached to the front part of the vehicle body 1 so as to be vertically movable by a boom cylinder 7 composed of a hydraulic cylinder. A bucket 8 is attached to the boom 6 so as to be vertically movable by a bucket cylinder 9 composed of a hydraulic cylinder. The wheel loader includes an electric motor (travel motor) 50 (refer to FIG. 4) as an electric motor for use in a part of a driving system of the work machine. As shown in FIG. 1, the wheel loader is moved forth as indicated by an arrow 11 by causing the rear wheels 3 to rotate with driving of the electric motor 50, in a posture in which the bucket 8 is lowered. Consequently, the bucket 8 is rotated upward as indicated by an arrow 13 by extending the bucket cylinder 9 while inserting the bucket 8 into the mound of earth and sand 12 as shown in FIG. 2, and the boom 6 is lifted by extending the boom cylinder 7. Thereafter, as shown in FIG. 3, the wheel loader is moved back as indicated by an arrow 14, and subsequently travels to a bed of a truck or a collection place and then deposits soil.

Figure 4:
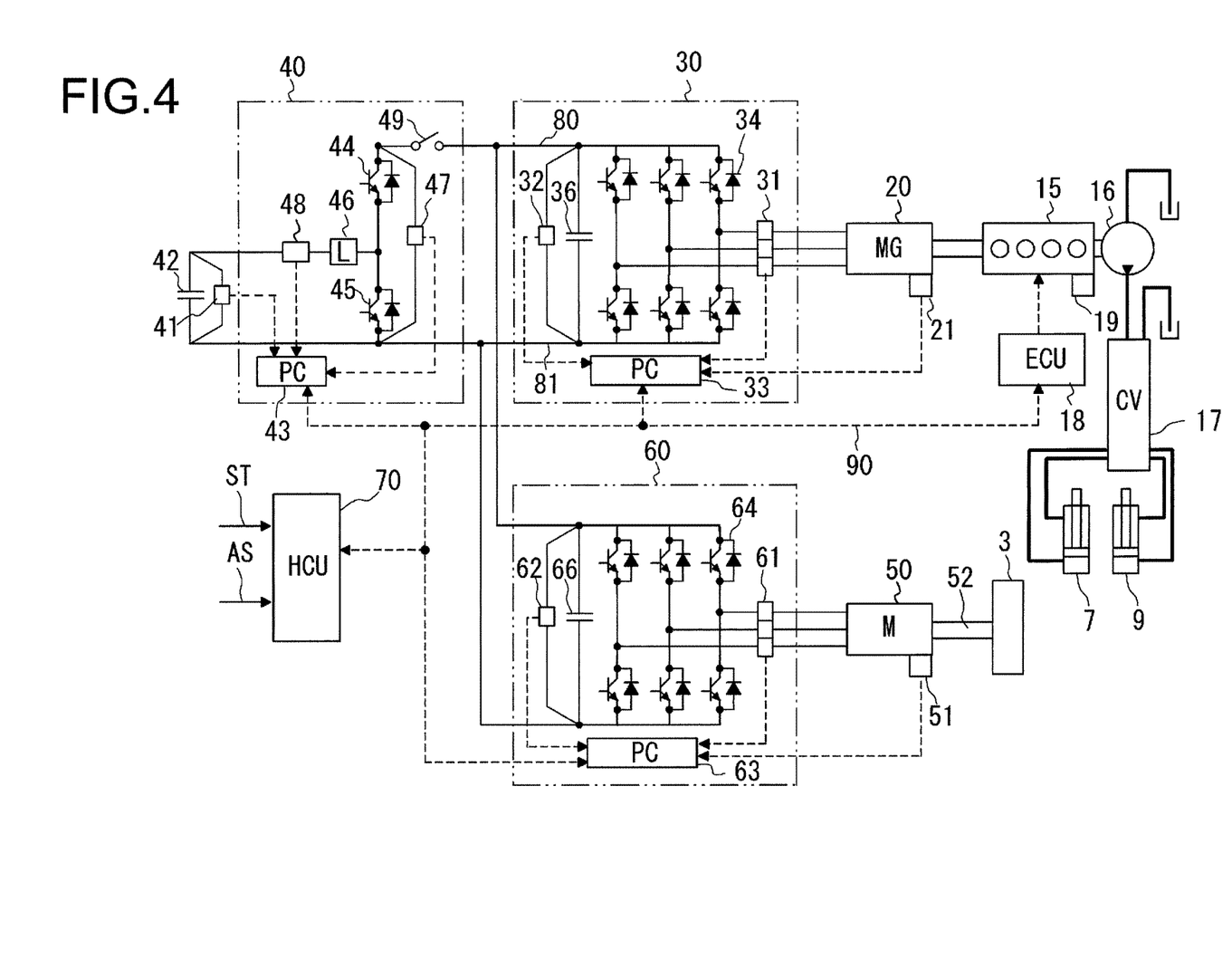
FIG. 4 is a circuit diagram showing an embodiment of a hydraulic electrical circuit of the wheel loader of the present invention.

FIG. 4 is a circuit diagram showing an embodiment of a hydraulic electrical circuit of the hybrid work machine (or hybrid work machine) of the present invention. The hybrid work machine according to the present embodiment has a hydraulic driving section and a travel driving section. In FIG. 4, a thick line indicates a hydraulic circuit, a thin line indicates a power line, and a broken line indicates an electrical signal line. Reference numeral 15 denotes an engine. Reference numeral 16 denotes a hydraulic pump to be driven by the engine 15. Reference numeral 20 denotes an engine-assist motor generator attached to the engine 15.

Reference numeral 18 denotes an engine control unit (ECU). Reference numeral 19 denotes an starter of the engine. These elements constitute the power source device 4 shown in FIGS. 1 to 3. Reference numeral 17 denotes a control valve to control a direction of hydraulic oil toward the boom cylinder 7 and the bucket cylinder 9, and its flow rate.

The motor generator 20 drives the engine 15 to assist the engine 15 when functioning as an electric motor, and also operates as a generator for power generation by receiving power from the engine 15 during normal traveling or during deceleration. The motor generator 20 is directly coupled to a crankshaft of the engine 15, or is coupled to the crankshaft of the engine 15 with a belt or gear interposed therebetween. The motor generator 20 is a permanent magnet synchronous generator. Reference numeral 21 denotes a rotation sensor to detect a rotation speed of the motor generator 20.

Reference numeral 30 denotes a three-phase inverter (first power converter) disposed between both DC buses 80 and 81 and the motor generator 20. Reference numeral 42 denotes an electricity storage device. Reference numeral 40 denotes a buck-boost converter disposed between both the DC buses 80 and 81 and the electricity storage device 42. Reference numeral 50 denotes an electric motor configured to function as a travel motor. Reference numeral 60 denotes a three-phase inverter (second power converter) disposed between both the DC buses 80 and 81 and the electric motor 50. Reference numeral 70 denotes a hybrid control unit HCU which controls the engine 15, the inverter 30, the buck-boost converter 40, and the inverter 60 via the engine control unit (ECU) 18, power controllers (PCs) 33, 43, and 63, respectively. Reference numeral 90 denotes a controller area network (CAN) that establishes a connection between the HCU 70 and the ECU 18, the PCs 33, 43, and 63.

When the motor generator 20 operates as the generator, the inverter 30 converts the generated AC power to DC power and feeds this to the electricity storage device 42 via the DC buses 80 and 81 and the buck-boost converter 40. When causing the motor generator 20 to operate as the electric motor, the inverter 30 converts the DC power stored in the electricity storage device 42 to AC power to drive the motor generator 20. The inverter 30 includes six semiconductor switches 34. Although IGBTs are used as the semiconductor switches 34 of the inverter 30 in the present embodiment, other power semiconductor elements may be used. Reference numeral 31 denotes a motor current sensor to detect a current of the motor generator 20. Reference numeral 32 denotes a bus voltage sensor to detect voltage of the DC buses 80 and 81. Reference numeral 36 denotes a capacitor to smooth DC voltage of the DC buses 80 and 81.

When the PC 33 built in the inverter 30 receives via the CAN 90 a torque command from the HCU 70 to operate the motor generator 20 as the motor, the inverter 30 performs PWM control by turning on and off gates of the semiconductor switches 34 on the basis of information from the motor current sensor 31, the rotation sensor 21 of the motor generator 20 and the bus voltage sensor 32, and makes control so that a desired motor torque is generated.

The electricity storage device (may also be referred as electricity storage element or capacitor) 42 stores, via the buck-boost converter 40, generated power of the motor generator 20 and regenerative electric power of the electric motor 50. The buck-boost converter 40 is configured to, when necessary, supply power from the electricity storage device 42 to the motor generator 20 via the inverter 30, and also supply power from the electricity storage device 42 to the electric motor 50 via the inverter 60. The electricity storage device 42 may be configured to store only the generated power by the motor generator 20. As the electricity storage device 42, a large-capacity capacitor that is called ultracapacitor (also called electric double-layer capacitor) is used in the present embodiment. Instead of the capacitor, a secondary battery, such as a lithium ion battery, may be used as the electric storage device 42.

In the buck-boost converter 40, the PC 43 receives, via the CAN 90, a voltage command and an on/off command of a relay 49 from the HCU 70, performs PWM control by turning on and off a gate of each of semiconductor switches 44 and 45 on the basis of information from a current sensor 48 and a voltage sensor 47, and raises or lowers a voltage of the electricity storage device 42 by using an inductance 46.

The electric motor 50 operates on power from the electricity storage device 42 and/or the motor generator 20, and drives the rear wheels 3. The electric motor 50 includes a rotation sensor 51 to detect a rotation speed. The electric motor 50 is coupled to the rear wheels 3 via a propeller shaft for traveling 52. A permanent magnet synchronous generator or an induction motor is used as the electric motor 50. The electric motor 50 needs a higher voltage as a voltage for the DC buses 80 and 81 for outputting at a high-speed rotation and a large torque. Hence in the present embodiment, when a torque required at the electric motor 50 exceeds an outputtable torque at the voltage of the DC buses 80 and 81, the voltage of the DC buses 80 and 81 is temporarily raised. Voltage rise control of the DC buses 80 and 81 in the present embodiment is described later.

The inverter 60 drives the electric motor 50 and converts regenerative power of the electric motor 50 to DC power. Reference numeral 66 denotes a capacitor to smooth an input voltage. The inverter 60 includes six semiconductor switches 64. Although an IGBT is used as the semiconductor switch 64 in the present embodiment, other power semiconductor element may be used.

The PC 63 built in the inverter 60 receives, via the CAN 90, a torque command from the HCU 70. The inverter 60 performs PWM control by turning on and off gates of the semiconductor switches 64 on the basis of information from a current sensor 61 of the electric motor 50, the rotation sensor 51 of the electric motor 50, and a voltage sensor 62 of the DC buses 80 and 81, and makes control so that a desired motor torque is generated.

Major inputs of the HCU 70 are a start signal ST and an accelerator pedal depressing signal AS that indicates an amount of depression of an accelerator pedal. The HCU 70 controls the engine 15 by sending a rotation command via the CAN 90 to the ECU 18. The ECU 18 brings the engine 15 to a stop upon receipt of an engine stop command from the HCU 70. The engine 15 starts by the starter 19.

Figure 5:
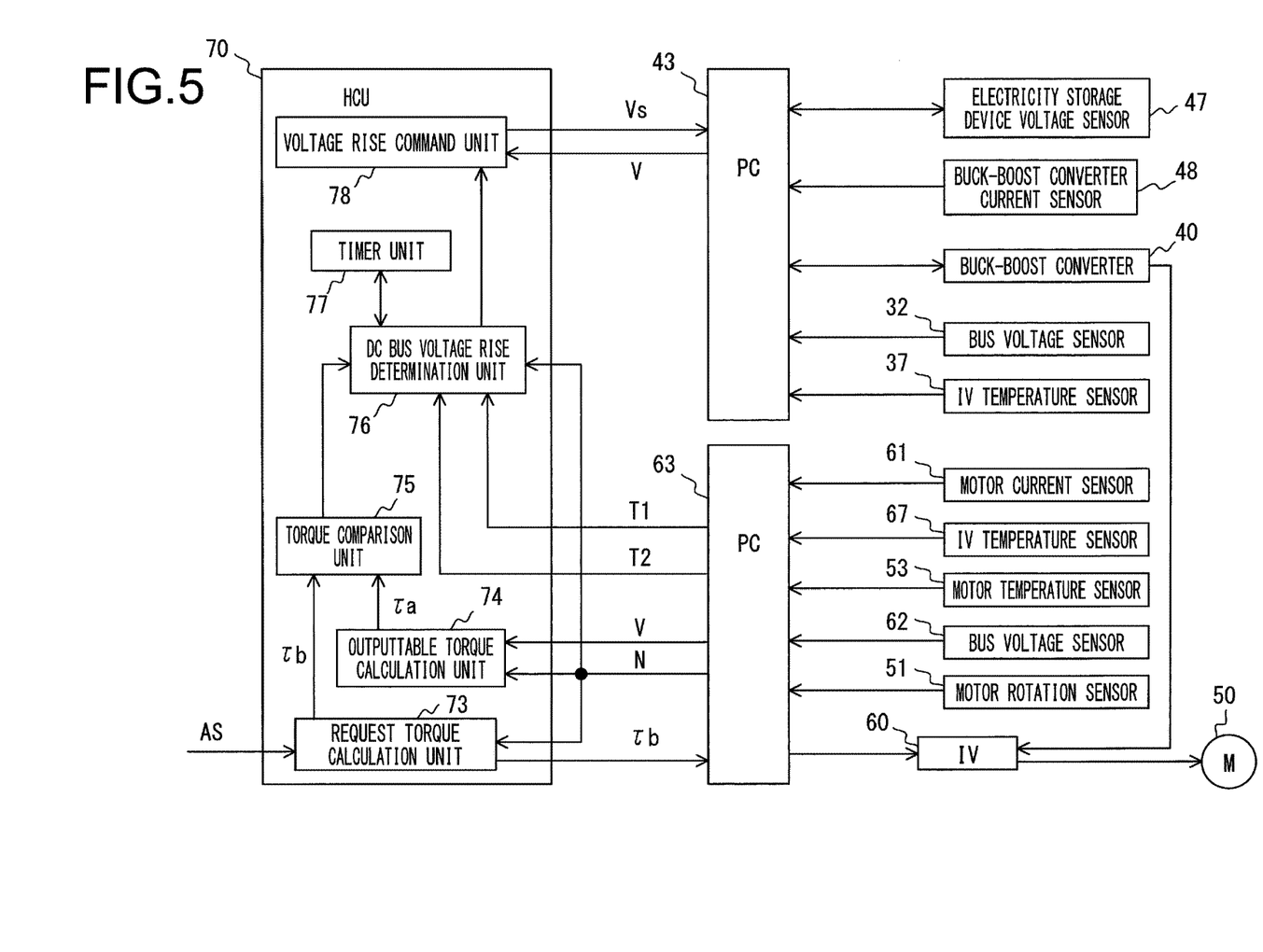
FIG. 5 is a functional block diagram of the present embodiment.

FIG. 5 is a block diagram that describes functions of the circuits in FIG. 4. In FIG. 5, reference numerals, which are the same as those in FIG. 4, indicate the same units or components. Of sensors that input a detection signal to the PC 43 of the buck-boost converter 40, an IV temperature sensor 37 is a temperature sensor included in the inverter 30 in order to protect the semiconductor switches 34. Of sensors that input a detection signal to the PC 63 of the inverter 60, an IV temperature sensor 67 is a temperature sensor included in the inverter 60 in order to protect the semiconductor switches 64. A motor temperature sensor 53 is a temperature sensor included in the electric motor 50 in order to protect the electric motor 50.

In the HCU 70, a request torque calculation unit (first calculation unit) 73 is configured to compute or calculate a request torque τb from the accelerator pedal depressing signal AS corresponding to an amount of depression of the accelerator pedal. As an example of the calculation, there is a method using a characteristic table between a rotation speed N of the electric motor 50 being set in advance and the request torque τb (not shown). The characteristics between the rotation speed N of the electric motor 50 and the request torque τb have an approximately inversely proportional relationship. At the same rotation speed, the request torque τb increases with increase in the accelerator pedal depressing signal AS. The request torque calculation unit 73 is capable of calculating, from the characteristic table, a corresponding request torque τb from the accelerator pedal depressing signal AS being input, and the rotation speed N of the electric motor 50 to be detected by the rotation sensor 51.

An outputtable torque calculation unit (second calculation unit) 74 is a unit to compute or calculate an outputtable torque τa, which is outputtable or possible to be output by the electric motor 50, from voltage V of the DC buses 80 and 81 to be detected by the voltage sensor 62 included in the inverter 60, and the rotation speed N of the electric motor 50. Although the bus voltage sensors 32 and 62 are respectively included in the inverters 30 and 60 in the embodiment in FIG. 4, both sensors are originally included in the inverters 30 and 60, and detect an identical DC bus voltage V of the DC buses 80 and 81.

Figure 6:
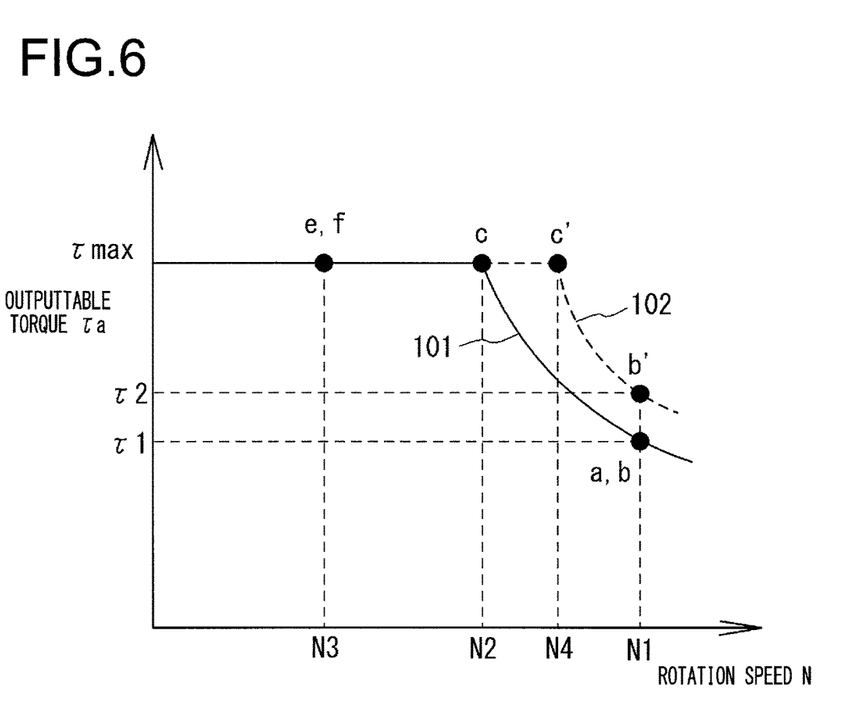
FIG. 6 shows a graph showing a relationship between a rotation speed of an electric motor and outputtable torque in the present embodiment, in contradistinction to that in a conventional one.

FIG. 6 is a diagram that describes a relationship between the outputtable torque τa and the rotation speed N of the electric motor 50, in which max denotes a maximum torque being originally set to the electric motor 50. A curve 101 indicates characteristics of the outputtable torque τa in the case of employing a conventional control method with which the voltage of the DC buses 80 and 81 is kept in a fixed range. A curve 102 indicates characteristics of the outputtable torque τa in the case of increasing the voltage of the DC buses 80 and 81 under control in the present embodiment as described later.

A torque comparison unit 75 is a unit to make a comparison in magnitude between the request torque τb and the outputtable torque τa. A DC bus voltage rise determination unit 76 is a unit to determine whether or not to raise the voltage V of the DC buses 80 and 81, while referring to whether detected temperatures T1 and T2 respectively detected by the temperature sensor 67 of the inverter 60 and the temperature sensor 53 of the electric motor 50 reach upper limit temperatures T10 and T20, on the basis of a comparison result obtained by the torque comparison unit 75. A timer unit 77 is a unit to measure time during which the DC bus voltage is on the rise in order to place a limit on time during which the DC bus voltage V has already been raised.

A voltage rise command unit 78 is configured to send a command Vs for raising a voltage to the PC 43 of the buck-boost converter 40 when necessary, on the basis of a determination result in the DC bus voltage rise determination unit 76, while referring to the DC bus voltage V to be detected by the bus voltage sensor 32 or 62. These units 73 to 78 are achievable through a computer program.

Operations performed when an actual work is carried out with the wheel loader having the foregoing configurations are described below. For ease of understanding, the operation performed when making the conventional control, under which the DC bus voltage V is not raised, is described with reference to a time chart in FIG. 8. Points "a" to "f" of the time chart in FIG. 8 correspond to points "a" to "f" in FIG. 6.

As shown in FIG. 1, an operator depresses the accelerator pedal to cause the wheel loader to move forth toward the mound of earth and sand 12 as indicated by the arrow 11. As shown in FIG. 2, when the bucket 8 is inserted into the mound 12 at a time point "a" in FIG. 8, a travel resistance increases as the bucket 8 enters deeper into the mound 12 at a constant vehicle body speed. A torque necessary for the electric motor 50 increases accordingly.

Figure 8:
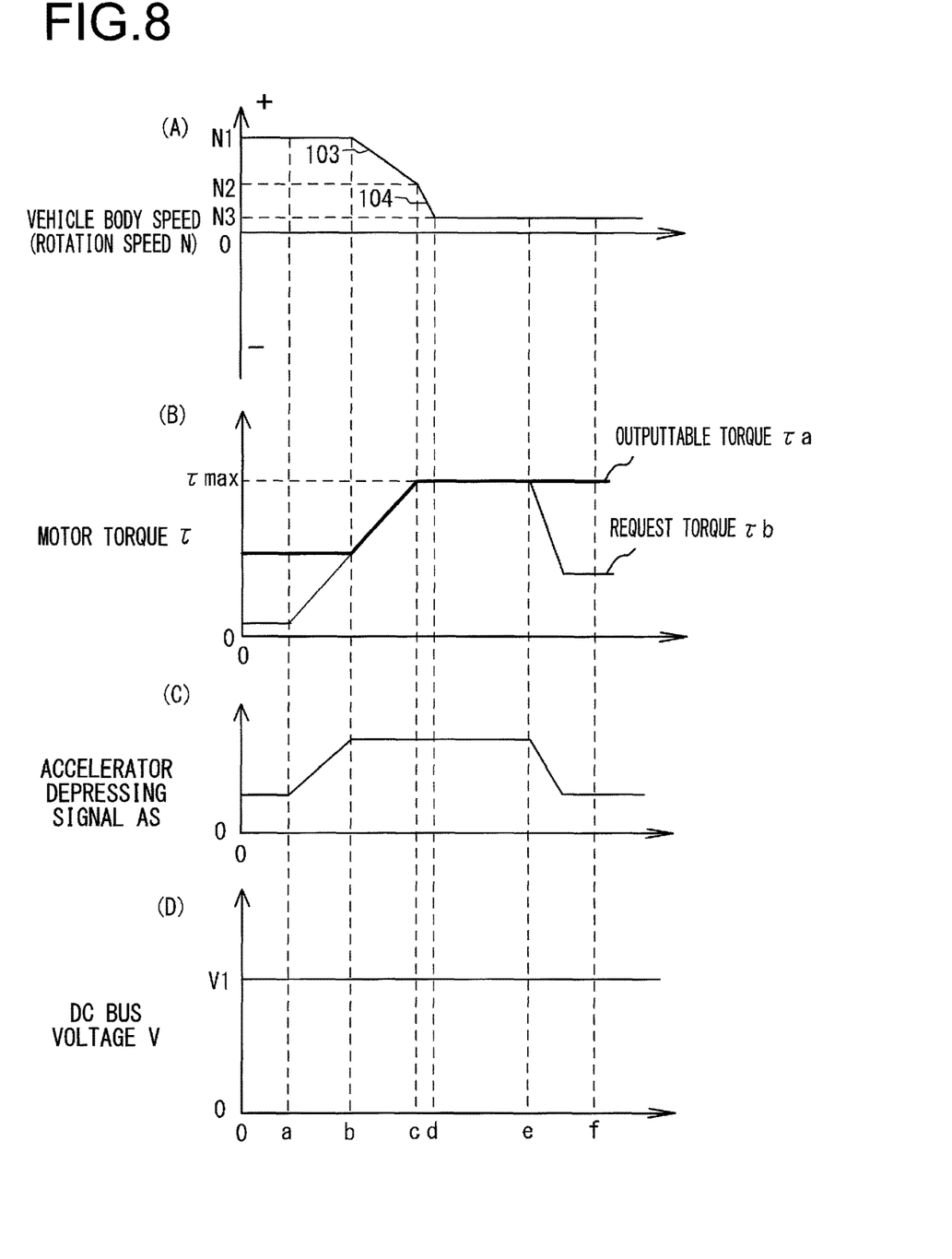
FIG. 8 shows time charts that describe operations when the control of the present embodiment is not performed.

In order to carry out further excavation with the constant vehicle body speed maintained against the increase of the travel resistance, the operator increases the amount of depression of the accelerator pedal (the accelerator pedal depressing signal AS) from the time point "a" as shown in FIG. 8(C). When increasing the amount of depression of the accelerator pedal, during a period from a time point "0" to a time point "b", namely, a period during which the outputtable torque $\tau a$ is larger than the request torque $\tau b$ as shown in FIG. 8(B), the vehicle body speed (the rotation speed of the electric motor 50) can be maintained at a constant speed of N1 (refer to FIG. 8(A)). At that time, the wheel loader travels at an approximately constant vehicle body speed (rotation speed N1) at the time points "a" and "b" in a diagram showing a torque-rotation speed relationship diagram in FIG. 6.

However, when the outputtable torque $\tau a$ is not more than the request torque $\tau b$, the vehicle body speed decreases as shown in a line 103 in FIG. 8(A), and the torque of the electric motor 50 increases accordingly as shown in FIG. 8(B). In other words, at this torque increasing stage, the outputtable torque $\tau a$ increases while coinciding with the request torque $\tau b$, as the vehicle body speed decreases.

Thereafter, when it becomes a state in which the vehicle body speed is sufficiently decreased at the time point "c" in FIG. 8, the outputtable torque $\tau a$ coincides with the maximum torque max shown in FIG. 6. Therefore, from the time point "c" in FIG. 8(A), the rotation speed of the electric motor 50 further decreases from N2 along a line 104 in a state in which the outputtable torque $\tau a$ and the request torque $\tau b$ do not increase beyond the maximum torque max. The vehicle body speed stops decreasing at the time point "d" at which the travel resistance that is already decreased due to the decrease in the vehicle body speed coincides with the outputtable torque $\tau a$. Thereafter, excavation is carried out at the vehicle body speed of an approximately constant rotation speed N3.

When the operator makes a decision that digging through the mound of earth and sand 12 is completed, and eases up on the accelerator pedal at a time point "e" in FIG. 8, the request torque $\tau b$ decreases. An output torque at the time point "e" corresponds to a point "e" in FIG. 6. Even in the travel at a subsequent time point "f", the vehicle body speed is sufficiently decreased, and the outputtable torque $\tau a$ remains unchanged, thus making it possible to output a required torque. During a series of these operations, the voltage V of the DC buses 80 and 81 is approximately constant as shown in FIG. 8(D).

Figure 7:
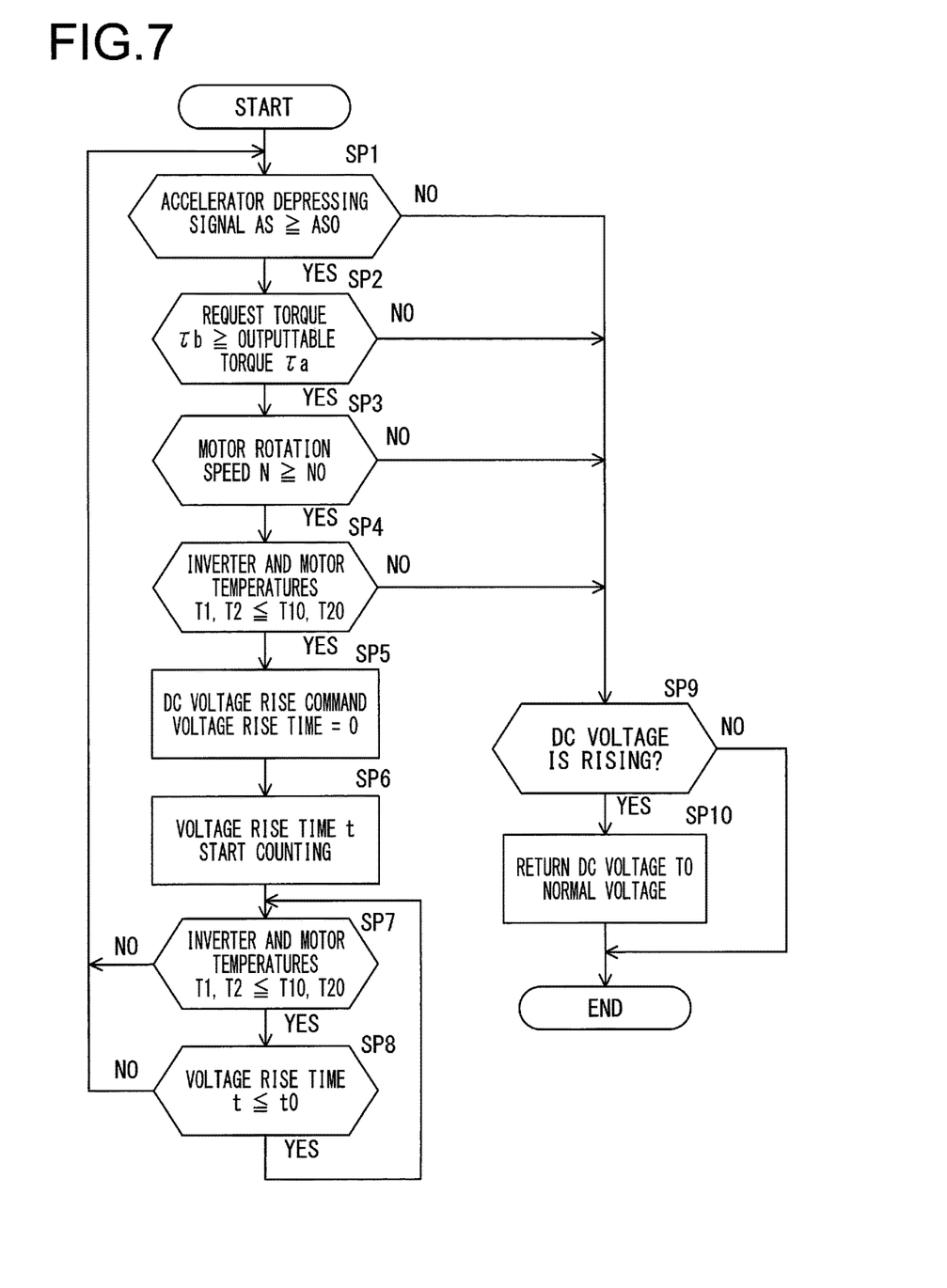
FIG. 7 is a flow chart that describes operations of the present embodiment.

In regard to this point, operations of the apparatus according to the present embodiment shown in FIGS. 4 and 5 are described below with reference to a flow chart in FIG. 7 and a time chart in FIG. 9. Points "a" to "f" and points b' and c' of the time chart in FIG. 9 correspond to points "a" to "f" and b' and c' in FIG. 6. As described with reference to FIGS. 1 and 2, the operator depresses the accelerator pedal to cause the wheel loader to move forth toward the mound of earth and sand 12 as indicated by the arrow 11. When the bucket 8 is inserted into the mound 12 at a time point "a" in FIG. 9, a travel resistance increases as the bucket 8 enters deeper into the mound 12 at a constant vehicle body speed. A torque necessary for the electric motor 50 increases accordingly.

Here, the request torque calculation unit 73 shown in FIG. 5 calculates a request torque $\tau b$ from an accelerator pedal depressing signal AS. As shown in FIG. 9, the request torque $\tau b$ increases from the time point "a" as the accelerator pedal depressing signal AS increases.

The outputtable torque calculation unit 74 calculates an outputtable torque $\tau a$ by referring to a rotation speed N of the electric motor 50 and voltage V of the DC buses 80 and 81 to be detected by the voltage sensor 62. As shown in FIG. 6, the outputtable torque $\tau a$ decreases as the rotation speed N increases as indicated by the line 101, when it is not less than a certain vehicle body speed (the rotation speed N2 of the electric motor 50).

The torque comparison unit 75 compares the request torque $\tau b$ and the outputtable torque $\tau a$. It is however regarded that no torque increase request exists while the accelerator pedal depressing signal AS is small in a normal operation. Therefore, the torque comparison unit 75 performs no torque comparison while the accelerator pedal depressing signal AS≥AS0 (threshold value) is not satisfied (step SP1 in FIG. 7). The threshold value AS0 is a predetermined value, based on which a determination is made as to whether or not to perform a comparison between the request torque $\tau b$ and the outputtable torque $\tau a$ by the torque comparison unit 75. As the threshold value AS0, it is possible to use a value of the accelerator pedal depressing signal AS corresponding to at least approximately 50% of an amount of depression when the accelerator pedal is depressed at a maximum, preferably a value of the accelerator pedal depressing signal AS corresponding to approximately 75-85% of the amount of depression.

When the accelerator pedal depressing signal AS reaches the threshold value AS0 due to the increase in the amount of depression of the accelerator pedal, the torque comparison unit 75 performs a torque comparison (step SP2), and makes a determination as to whether the request torque $\tau b$ reaches the outputtable torque $\tau a$. In other words, at a stage in which the amount of depression of the accelerator pedal is small and the accelerator pedal depressing signal AS is smaller than the threshold value AS0 (the time points "0" to "b" in FIG. 9), the request torque $\tau b$ is small and does not reach the outputtable torque $\tau a$ ($\tau a > \tau b$), and therefore the torque comparison unit 75 does not activate the DC bus voltage rise determination unit 76.

When the accelerator pedal depressing signal AS≥AS0 and $\tau b \geq \tau a$ are satisfied (step SP2) (the time point "b" in FIG. 9), the procedure proceeds to step SP3, and the DC bus voltage rise determination unit 76 is activated under conditions that the rotation speed N of the electric motor 50 is not less than the threshold value N0 (N≥N0). The reason why the following DC bus voltage rise control is performed under the conditions that the rotation speed N of the electric motor 50 is not less than the threshold value N0 is that the maximum torque max is obtainable when the rotation speed N is low as apparent from the characteristic diagram in FIG. 6. Hence, the threshold value N0 of the rotation speed is set between the rotation speed N2 and the rotation speed N3 and in the vicinity of the rotation speed N2 in the torque-rotation speed characteristic diagram in FIG. 6.

Determinations in the DC bus voltage rise determination unit 76 are made as to whether the temperature T1 of the inverter 60 is not more than an upper limit value T10 and the temperature T2 of the electric motor 50 is not more than an upper limit value T20 (step SP4). The purpose of performing the following voltage rise processing only when the temperature of the inverter 60 and the temperature of the electric motor 50 do not exceed their respective upper limit temperatures is to protect the inverter 60 and the electric motor 50. When the temperature of the inverter 60 and the temperature of the electric motor 50 are not more than their respective upper limit values, the timer unit 77 is activated, and the timer unit 77 starts time measurement provided that a rise time t=0 (steps SP5, SP6).

The DC bus voltage rise determination unit 76 activates the voltage rise command unit 78, and the voltage rise command unit 78 sends a rise command signal Vs to the PC 43. As shown in FIG. 9(D), the buck-boost converter 40 increases the DC bus voltage V from V1 to V2 on the basis of the command Vs, and maintains the DC bus voltage V in a state of being raised. The state in which the DC bus voltage is thus increased is limited to within time t0 being set to the timer unit 77, and is maintained provided that the temperatures T1 and T2 of the inverter 60 and the electric motor 50 do not exceed the upper limit values T10 and T20, respectively (steps SP7, SP8). The time t0 to be set by the timer unit 77 is necessary and sufficient time required for sufficiently inserting the bucket 8 into the mound 12 by traveling. The time t0 is preferably set to 4-14 seconds, more preferably approximately 8-12 seconds.

Figure 9:
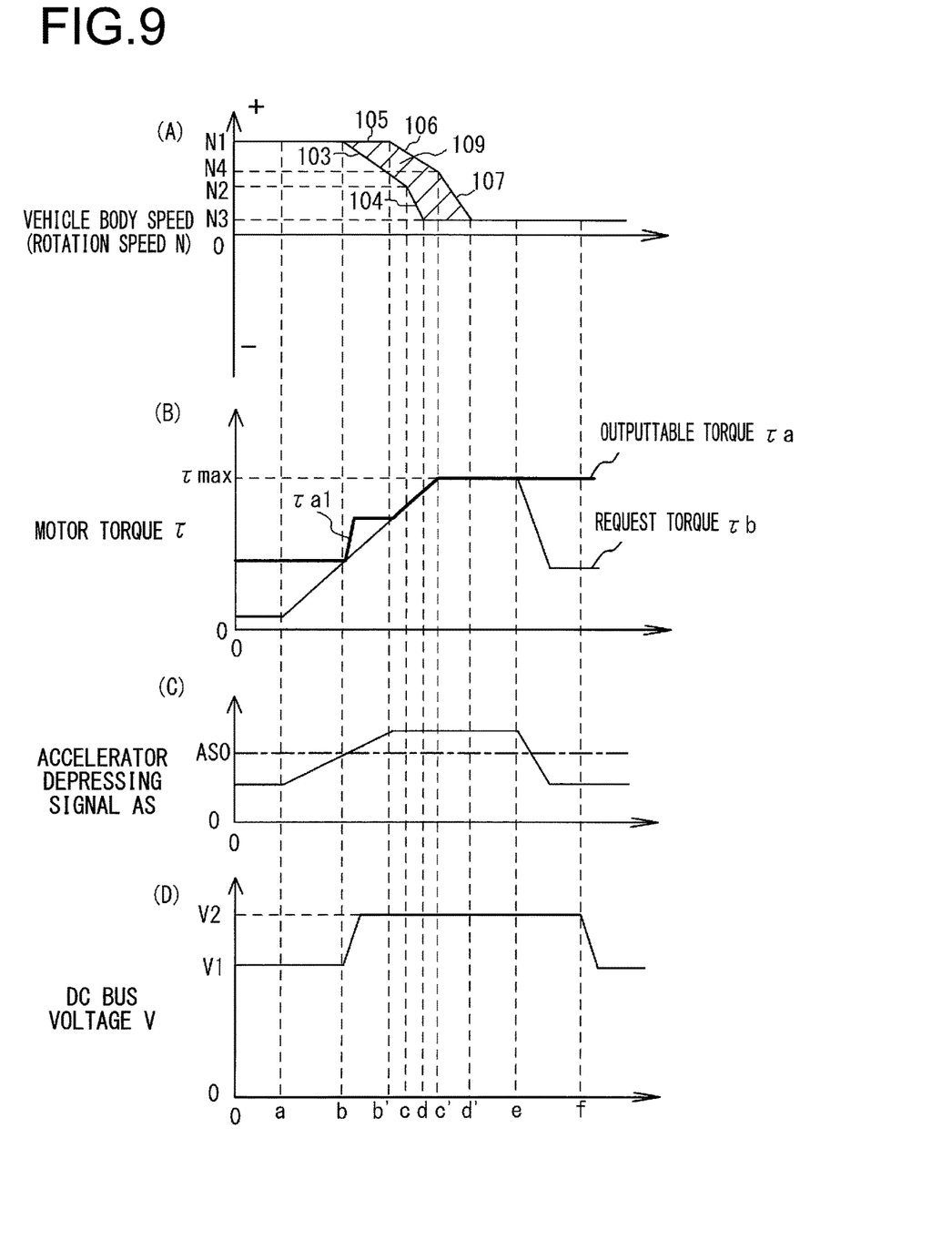
FIG. 9 shows time charts that describe an example of control of the present embodiment.

This ensures that the outputtable torque τa is larger than the request torque τb as indicated by τa1 in FIG. 9(B). That is, the outputtable torque τa can be increased from τ1 at the point "b" to τ2 at the point b' in FIG. 6. Consequently, as indicated by the line 105 in FIG. 9(A), a start point of the vehicle body speed drop can be delayed from the time point "b", at which the speed drops when the DC bus voltage is made constant, to the time point b', namely, until satisfying the request torque τb=the outputtable torque τa, thereby achieving driving without decreasing the vehicle body speed. Thereafter, as illustrated in relation to the time point b' to the time point c' in FIG. 9(B), the rotation speed N of the electric motor 50, namely, the vehicle body speed decreases along a line 106 in FIG. 9(A) and the line 102 in FIG. 6 as the request torque τb increases.

When the request torque τb and the outputtable torque τa reach the maximum value τmax at the time point c', the vehicle body speed decreases further as indicated by a line 107 in FIG. 9(A) in the state in which the request torque τb and the outputtable torque τa do not increase beyond the maximum value τmax. The vehicle body speed decrease continues until the time point d' in FIG. 9, at which a balance occurs between a travel resistance that is already decreased due to the vehicle body speed drop and a driving force of the vehicle body. Thereafter, the excavation is carried out at an approximately constant vehicle body speed.

When the operator makes a decision that the digging through the mound of earth and sand 12 is completed, and eases up on the accelerator from the time point "e" in FIG. 9, the request torque τb decreases as shown in FIG. 9(B). The following operation and action are the same as those in the case of FIG. 8 where the DC bus voltage rise is not performed.

Incidentally, the procedure proceeds to step SP9 when in steps SP1 to SP4, the accelerator depressing signal AS<AS0 (SP1), the request torque τb<the outputtable torque τa (SP2), the rotation speed N<N0 (SP3), the inverter temperature T1>T10, or the electric motor temperature T2>T20 (SP4) is satisfied. In step SP9, a determination is made as to whether the DC bus voltage is in a high state. When the DC bus voltage is in the high state of V2, the DC bus voltage is returned to a normal voltage V1 (SP10). When the DC bus voltage is not in the high state of V2, processing is suspended while waiting for the next accelerator pedal depressing signal.

With the present embodiment, when the torque τb required for the electric motor 50 exceeds the torque τa being outputtable at the voltage V of the DC buses 80 and 81 connected to the inverter 60, the voltage V of the DC buses 80 and 81 is temporarily raised from V1 to V2. This contributes to temporarily increasing the outputtable torque τa of the electric motor 50, thereby ensuring that the wheel loader is operated without a drop of the rotation speed N of the electric motor 50. That is, raising the DC bus voltage V causes a speed difference in the electric motor 50 as indicated by a slanted line part 109 in FIG. 9(A), thus making it possible to increase working efficiency than not raising the DC bus voltage V.

Only when a determination is made that the torque τb required for the electric motor 50 exceeds the torque τa being outputtable at the voltage V of the DC buses 80 and 81 at that time, the voltage V is temporarily raised. Consequently, the heat generation due to switching loss caused by an input voltage rise of the inverter 60 becomes temporary, thereby reducing heat generation of the inverter 60.

In the present embodiment, the DC bus voltage V is raised only when the rotation speed N of the electric motor 50 is not less than the rotation speed N0 of the threshold value that requires the increase of the outputtable torque τa. It follows that the DC bus voltage V is raised only when it is really necessary to increase the outputtable torque τa, thus making it possible to perform stable control of the electric motor 50.

Although the present invention is also applicable to other hybrid work machines besides the wheel loader, by performing the voltage control of the DC buses with respect to one in which the work machine is the wheel loader and the electric motor 50 is the travel motor as in the present embodiment, it is possible to smoothly insert the bucket into the mound and thereby improve excavation efficiency (working efficiency) even when the torque required for the travel motor is large as in the case of inserting the bucket 8 into the mound of earth and sand 12 which is an excavation object while causing the wheel loader to travel.

Although the example that the rear wheels 3 are driven by the electric motor 50 has been described in the present embodiment, it may be configured so that the front wheels 2 are driven by the electric motor 50. The present embodiment may be applied to a hybrid work machine with four-wheel drive configured to drive the front wheels 2 and the rear wheels 3.

Although the example that the travel operation is carried out through the accelerator pedal has been described in the present embodiment, instead of the accelerator pedal, a lever and software may be used as a travel operation member. The request torque τb may be obtained from a speed command value and an acceleration command value at the electric motor 50, instead of obtaining it from an operation signal through a travel operation member. Alternatively, the request torque τb may be obtained from a deviation between the speed command value and a measured value of the electric motor 50, or a deviation between the acceleration command value and a measured value thereof.

A determination may further be made as to whether or not to allow increase in the temperature at the DC buses 80 and 81 by using an upper limit temperature of the inverter 30 and an upper limit temperature of the motor generator 20. The voltage rise time needs to be held within a certain time range, and the voltage rise time may be a time period that varies depending on an operation state, instead of being set to be constant by the timer unit 77.

Figure 10:
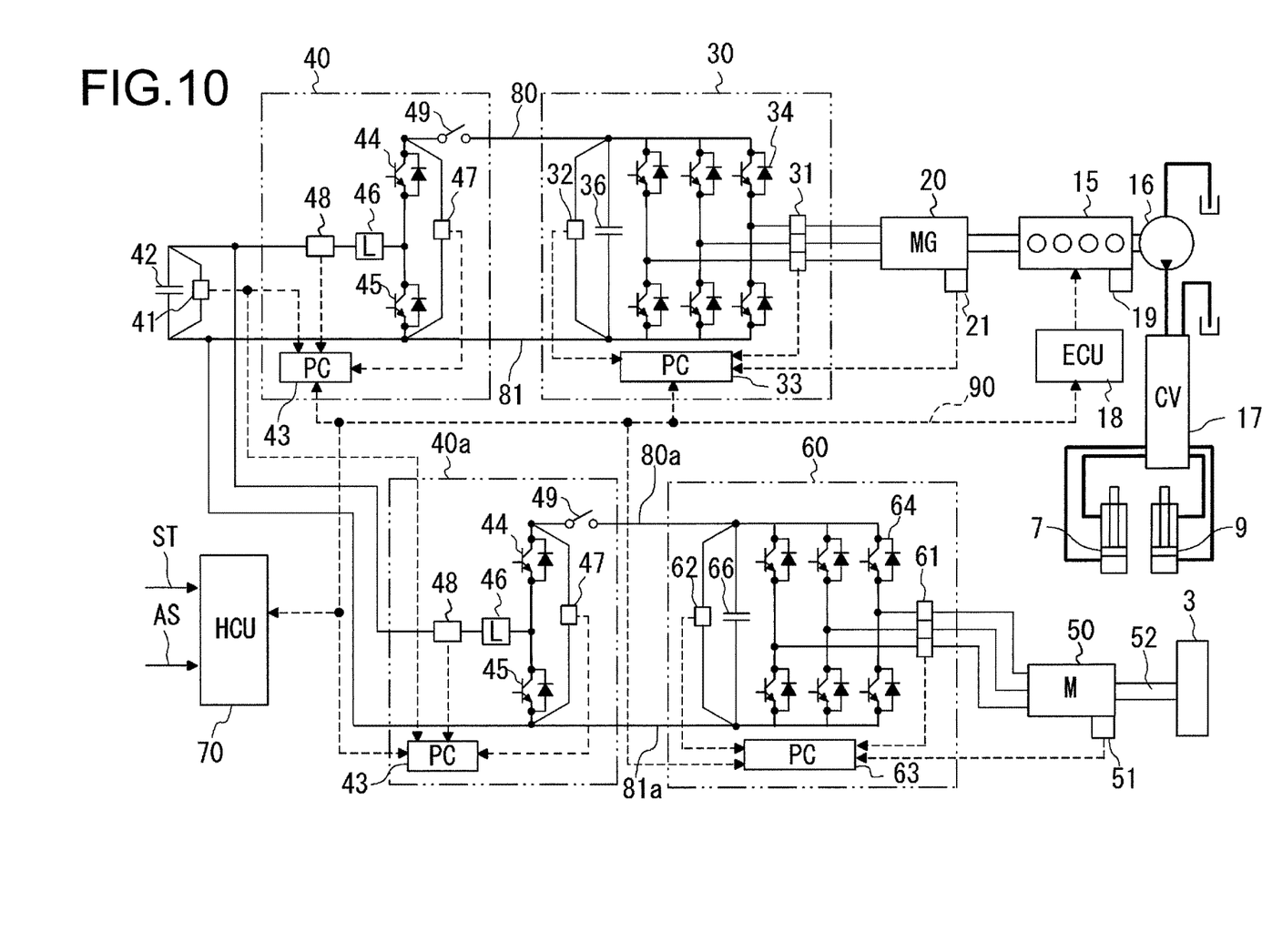
FIG. 10 is a circuit diagram showing another embodiment of the hydraulic electrical circuit in the work machine to which the present invention is applied.

Another embodiment of a hydraulic electrical circuit of a work machine, to which the present invention is applied, is described below. FIG. 10 is a circuit diagram showing another embodiment in which DC buses of dual systems exist individually, without commonalizing DC buses into a single system, on the hydraulic electrical circuit of the work machine to which the present invention is applied. In FIG. 10, components having functions similar to the components of the hydraulic electrical circuit in FIG. 4 are identified by the same reference numerals. In FIG. 10, second DC buses 80a and 81a are separately disposed which are not common to first DC buses 80 and 81 to be connected to an inverter 30 as a first power converter. The second DC buses 80a and 81a and an inverter 60 as a second power converter are connected to one another. A second buck-boost converter 40a is also disposed which performs power transfer between both the second DC buses 80a and 81a and an electricity storage device 42. Similarly to the first buck-boost converter 40, the second buck-boost converter 40a performs power transfer between the electricity storage device 42 and both the second DC buses 80a and 81a.

In the another embodiment, the voltage at the second DC buses 80a and 81a is temporarily raised when a torque required for an electric motor 50 exceeds a torque being outputtable at the voltage of the second DC buses 80a and 81a to be connected to the inverter 60. Voltage rise control of the second DC buses 80a and 81a is basically similar to the voltage rise control of the first DC buses 80 and 81 in the foregoing embodiment.

Thus, the another embodiment is capable of producing advantageous effects similar to those in the foregoing embodiment. Further in the another embodiment, the voltage at the second DC buses 80a and 81a, which are different from the first DC buses 80 and 81, is raised. Therefore, even when the inverter 60 temporarily generates heat due to voltage rise, the influence thereof is not exerted on equipment connected to the first DC buses 80 and 81. Furthermore, by disposing the DC buses of dual systems, the present invention is applicable to the case where the voltage of the first DC buses 80 and 81 is different from the voltage of the second DC buses 80a and 81a.

Although the another embodiment has exemplified the example that the first buck-boost converter 40 is disposed between the electricity storage device 42 and the inverter 30 as shown in FIG. 10, without limitation thereto, the electricity storage device 42 and the inverter 30 may be directly connected to each other without disposing the first buck-boost converter in case where a voltage range in which the electricity storage device 42 is used and an electricity storage device-side voltage range of the inverter 30 approximately match each other.

While the present invention has been described with reference to the various embodiments, various changes and additions can be made therein without departing from the scope of the present invention.

The disclosure of the following priority application is incorporated herein by reference in their entirety.

Japanese Patent Application No. 2014-82371 (filed on Apr. 11, 2014)

REFERENCE SIGNS LIST

6: boom, 7: boom cylinder, 8: bucket, 9: bucket cylinder, 15: engine, 16: hydraulic pump, 17: control valve, 18: engine controller, 20: motor generator, 30: inverter (first power converter), 33, 43, 63: power controller, 40: buck-boost converter (first buck-boost converter), 40a: second buck-boost converter, 42: electric storage device, 50: electric motor, 60: inverter (second power converter), 70: hybrid control unit, 80, 81: DC bus, 80a, 81a: second DC bus, 90: CAN

The invention claimed is:

1. A hybrid work machine, comprising:
an engine configured to drive a hydraulic pump as a hydraulic source of a hydraulic actuator;
an engine-assist motor generator attached to the engine;
an electric motor for use in a part of a driving system of the work machine;
a capacitor configured to store generated power of the motor generator;
an inverter disposed between the electric motor and DC buses; and
a buck-boost converter disposed between the DC buses and the capacitor, the capacitor being configured to store generated power of the motor generator or regenerative power of the electric motor which have been stepped down by the buck-boost converter, and supply electric power boosted by the buck-boost converter to the motor generator or the electric motor; and
a controller configured to temporarily raise the voltage of the DC buses when a torque required for the electric motor exceeds a torque outputtable at the voltage of the DC buses connected to the inverter, wherein the controller is adapted to:
calculate a request torque of the electric motor;
calculate an outputtable torque of the electric motor from a rotation speed of the electric motor and a voltage of the DC buses connected to the electric motor via the inverter;
compare the calculated request torque and the calculated outputtable torque; and
issue a command to temporarily raise a voltage of the DC buses, provided that the rotation speed of the electric motor is equal to or more than a threshold value when the request torque is equal to or more than the outputtable torque.

2. The hybrid work machine according to claim 1, wherein:
the controller is adapted to calculate an outputtable torque of the electric motor on a basis of a rotation speed of the electric motor and a voltage of the DC buses.

3. The hybrid work machine according to claim 1, further comprising:
another inverter different from the inverter, the another inverter being disposed between the motor generator and the DC buses and being connected to the DC buses.

4. The hybrid work machine according to claim 1, further comprising:
another inverter different from the inverter, the another inverter being disposed between other DC buses different from the DC buses and the motor generator and being connected to the other DC buses.

5. The hybrid work machine according to claim 1, wherein:
the controller is adapted to temporarily raise a voltage of the DC buses via the buck-boost converter.

* * * * *